United States Patent [19]
Kadoi et al.

[11] Patent Number: 5,335,635
[45] Date of Patent: Aug. 9, 1994

[54] COMBUSTION CHAMBER FOR AN INTERNAL COMBUSTION ENGINE

[75] Inventors: Noriaki Kadoi, Tokyo; Fujio Takimoto, Chiba, both of Japan

[73] Assignee: Fuji Jukogyo Kabushiki Kaisha, Tokyo, Japan

[21] Appl. No.: 72,584

[22] Filed: Jun. 4, 1993

[30] Foreign Application Priority Data

Jul. 22, 1992 [JP] Japan .................. 4-216441

[51] Int. Cl.⁵ .................. F02B 17/00; F02M 61/14
[52] U.S. Cl. .................. 123/295; 123/305; 123/302; 123/298
[58] Field of Search ............... 123/298, 302, 305, 432, 123/90.22, 90.23, 295, 276

[56] References Cited

U.S. PATENT DOCUMENTS

| | | | |
|---|---|---|---|
| 3,318,292 | 5/1967 | Hideg | 123/302 X |
| 4,014,300 | 3/1977 | Klomp | 123/298 X |
| 4,920,937 | 5/1990 | Sasaki et al. | 123/298 X |
| 5,009,204 | 4/1991 | Ishii | 123/432 X |
| 5,058,548 | 10/1991 | Morikawa et al. | 123/298 |
| 5,058,549 | 10/1991 | Hashimoto et al. | 123/298 |
| 5,143,036 | 9/1992 | Shiraishi et al. | 123/432 X |

FOREIGN PATENT DOCUMENTS 62-82222 4/1987 Japan .
63-189614 8/1988 Japan .

*Primary Examiner*—Willis R. Wolfe
*Attorney, Agent, or Firm*—Martin A. Farber

[57] ABSTRACT

Each cylinder of an internal combustion engine has two intake valves, two exhaust valves, a fuel injector and a spark plug. The fuel injector is vertically provided in a cylinder head of the engine such that a nozzle of the fuel injector is located in a central position of a combustion chamber. The spark plug is disposed between intake ports of the intake valves, so that an electrode of the spark plug is located near the nozzle of the fuel injector.

3 Claims, 2 Drawing Sheets

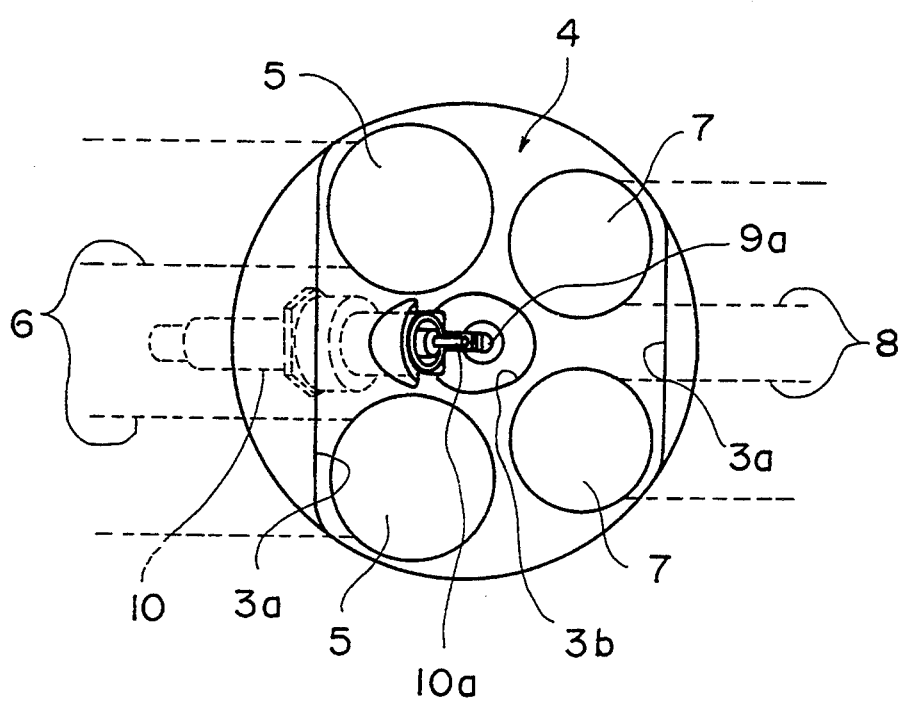

COMBUSTION CHAMBER FOR AN INTERNAL COMBUSTION ENGINE

BACKGROUND OF THE INVENTION

The present invention relates to a combustion chamber construction for an internal combustion engine with a direct fuel injection system, and more particularly to an arrangement of elements in a combustion chamber of the engine for promoting stratified combustion.

It is preferable that, in a light engine load range, an air-fuel mixture becomes rich near a spark plug at a later stage of the compression stroke, because the combustion is stably performed even if the air-fuel mixture is extremely lean in the entire zone. Thus, fuel consumption is improved.

In order to improve the stratified combustion in the light engine load range, a direct fuel injection system has been proposed. The engine having such an injection system is called a direct injection stratified charge (DISC) engine. In the system, the fuel is directly injected into a combustion chamber of the cylinder by a fuel injector provided in the cylinder.

In the combustion chamber, an intake valve and an exhaust valve are also disposed. Therefore, the design for the arrangement of the fuel injector is limited by disposition of the intake and exhaust valves. In particular, in an engine having two intake valves and two exhaust valves in each cylinder, the design for disposing the fuel injector is further limited because two intake ports and two exhaust ports are formed in a cylinder head.

Japanese Patent Application Laid-open No. 62-82222 discloses a DISC engine having four valves in which spark plug is provided between the exhaust ports in an inclined position and a fuel injector is provided between the intake ports in an inclined position. In Japanese Patent Application Laid-open No. 63-189614, a spark plug is provided on a central position of a combustion chamber in a vertical position and a fuel injector is provided between the intake ports in an inclined position In the conventional engines, a nozzle of the fuel injector is disposed far away from an electrode of the spark plug. Therefore, it is difficult to accurately control an air-fuel mixture near the spark plug. As a result, ignitability of the fuel reduces, causing unstable combustion of the fuel.

Furthermore, since the fuel injector is provided in the inclined position, spray of fuel is directed to the wall of the cylinder and the fuel is cooled by the wall of the cylinder, whereby the combusion operation deteriorates.

If quantity of injected fuel is increased at an advanced fuel injection timing, a part of the fuel spray directly impacts the wall of the cylinder, which causes an increase of HC emission and a reduction of lubrication effect on the cylinder liner.

SUMMARY OF THE INVENTION

An object of the present invention is to provide a combustion chamber construction for an internal combustion engine having two intake valves and two exhaust valves in each cylinder, which may insure stable fuel combustion without providing a particular means, and may eliminate disadvantages caused by the arrangement of an inclined fuel injector.

According to the present invention, there is provided a combustion chamber construction for an internal combustion engine having a cylinder head, each cylinder of the engine having a combustion chamber, two intake valves, two exhaust valves, a fuel injector and a spark plug.

The fuel injector is vertically provided in the cylinder head so that a nozzle of the fuel injector is located in a central position of the combustion chamber at an upper portion thereof, and the spark plug is disposed between intake ports of the intake valves, such that an electrode of the spark plug is located near the nozzle of the fuel injector.

The intake ports are disposed in parallel with each other. The combustion chamber has a conical recess, and the nozzle of the fuel injector is located in the conical recess.

The other objects and features of this invention will become understood from the following description with reference to the accompanying drawings.

BRIEF DESCRIPTION OF DRAWINGS

FIG. 2 is a sectional plan view of the combustion chamber.

DETAILED DESCRIPTION OF THE PREFERRED EMBODIMENT

Figure 1:
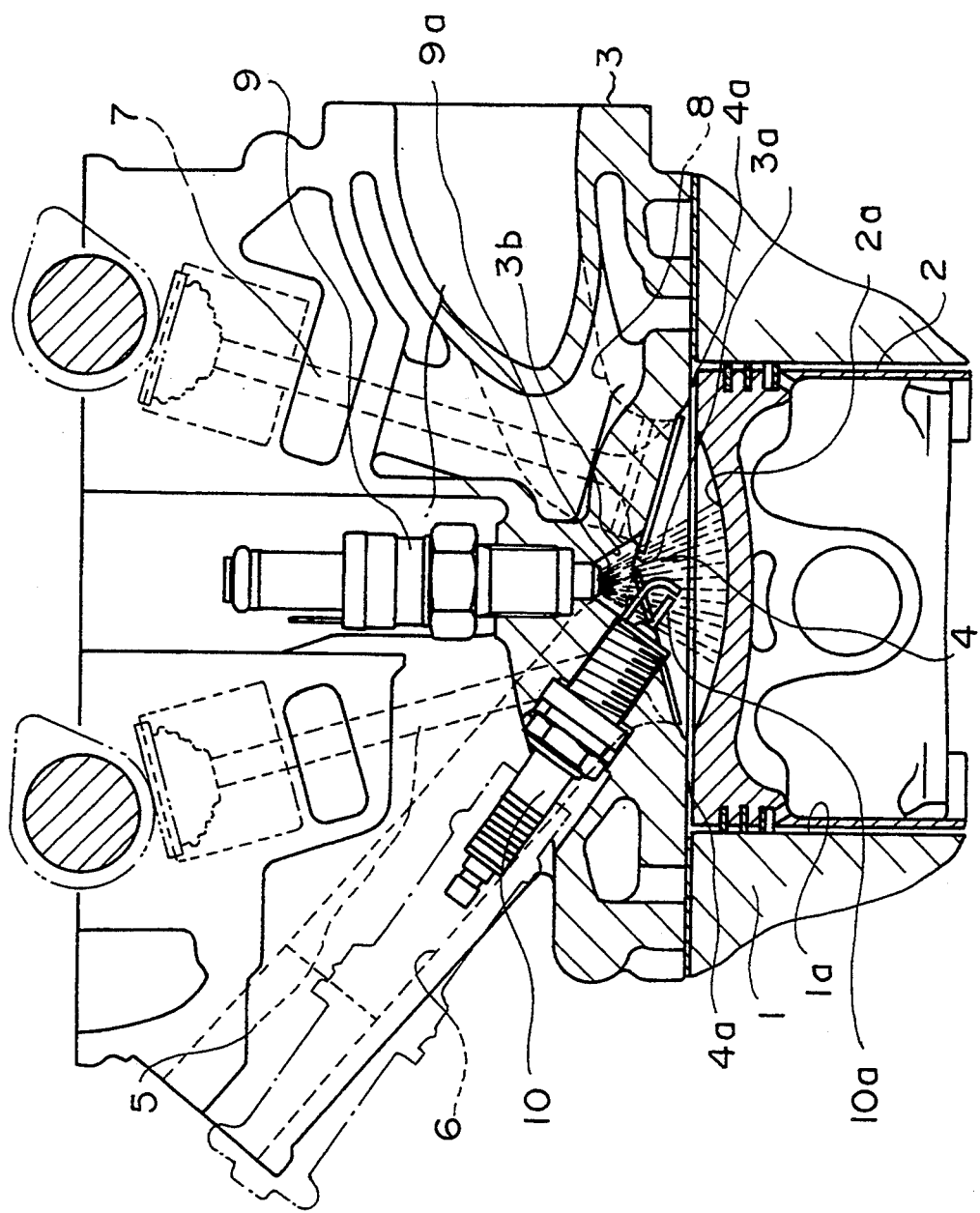
FIG. 1 is a sectional side view showing a combustion chamber construction of a cylinder according to the present invention.

Referring to FIGS. 1 and 2, a four-valve engine comprises a cylinder block 1 having a cylinder bore 1a, a piston 2 provided in the bore 1a, a cylinder head 3 secured to the cylinder block 1, and a combustion chamber 4. The combustion chamber 4 is defined by a roof-shaped underside 3a formed on the cylinder head 3 and a crown 2a of the piston 2. The roof-shaped underside 3a is divided into two halves to be tilted like the roof of a house in section. The crown 2a of the piston 2 has a spherical recess. The underside 3a is connected to a squish zone 4a formed on the outer periphery thereof which is formed in parallel with the outer periphery of the spherical crown 2a. A recess 3b having a conical shape in section is formed on the top of the tilted underside 3a at a position at the axis of the cylinder bore 1a. A fuel injector 9 is vertically mounted on the summit of the recess 3b. A nozzle 9a of the fuel injector 9 is exposed to the recess 3b.

A pair of intake ports 6 and a pair of exhaust ports 8 are communicated with the combustion chamber 4. A pair of intake valves 5 and a pair of exhaust valves 7 are slidably mounted in the cylinder head 3 for closing the intake ports 6 and the exhaust ports 8, respectively.

As shown in FIG. 2, the intake ports 6 are formed in the cylinder head 3 in parallel with each other. A spark plug 10 is provided between the intake ports 6 in an inclined position at an angle of about 60 degrees to the vertical axis of the fuel injector 9. An electrode 10a of the spark plug 10 is located in the combustion chamber 4 at a lower portion of the conical recess 3b adjacent to the nozzle 9a of the fuel injector 9.

In the system, an electronic control unit (not shown) is provided for controlling the quantity of fuel injected from the fuel injector 9 and the fuel injection timing, and the ignition timing of the spark plug 10, so that in the light engine load range, the stratified combustion may be achieved, and in the heavy engine load range, homogeneous mixture combustion may be performed.

In the light engine load range, the air-fuel mixture injected from the injector 9 approaches the electrode 10a of the spark plug 10. Thus a rich air-fuel mixture is formed near the electrode 10a, thereby insuring the stratified combustion.

In accordance with the present invention, the electrode of the spark plug is disposed near the nozzle of the fuel injector so that rich air-fuel mixture is formed near the electrode. Thus, stratified combustion is precisely performed with high ignitability and combustion stability.

Since the fuel injector is vertically disposed in the combustion chamber, the fuel is injected toward the center of the combustion chamber without striking the wall of the cylinder. Thus, the injected fuel is not cooled by the wall of the cylinder. Consequently, the injected fuel is perfectly burned without increasing HC discharge and reducing the lubricating effect on the cylinder liner.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A combustion chamber for an internal combustion engine comprising:
    a cylinder block and a cylinder head disposed on said cylinder block, and a piston inserted in said cylinder block for reciprocating therein, said cylinder head having a bottom facing a concave crown of said piston, said bottom having a cone-shaped recess facing said crown;
    a combustion chamber structure defined between said bottom recess of said cylinder head and a concavity of said piston;
    two intake ports formed at a half side of said bottom for inducing air into said combustion chamber structure, an intake valve provided at an end of each of said intake ports for opening and closing thereof, and two exhaust ports formed at another half end of said bottom for exhausting burnt gases, and an exhaust valve provided at an end of each of said exhaust ports;
    a fuel injector vertically inserted into said cylinder head for directly injecting fuel at a center of said combustion chamber so as to form a symmetrical fuel flow cone on said concave crown, an injection nozzle of said fuel injector being located at a top of said recess of said cylinder head; and
    a spark plug diagonally inserted into said cylinder head between said two intake ports for igniting an air-fuel mixture at said center of said combustion chamber, an electrode of said spark plug being located at a center of the fuel flow cone.

2. The combustion chamber according to claim 1, wherein
    the intake ports are disposed in parallel with each other against an axis of said cylinder.

3. The combustion chamber according to claim 1, wherein
    the location of said nozzle of the fuel injector in the conical recess ensures a stratified combustion in a light engine load range and a homogeneous mixture combustion in a heavy engine load range.

* * * * *